US012667890B2

(12) United States Patent (10) Patent No.: US 12,667,890 B2
Heitmann (45) Date of Patent: Jun. 30, 2026

---

(54) CONTROL UNIT FOR PULSED IRRADIATION IN ADDITIVE MANUFACTURE

(71) Applicant: Siemens Energy Global GmbH & Co. KG, Munich (DE)

(72) Inventor: Timo Heitmann, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 242 days.

(21) Appl. No.: 17/843,642

(22) Filed: Jun. 17, 2022

(65) Prior Publication Data

US 2023/0038571 A1 Feb. 9, 2023

(30) Foreign Application Priority Data

Aug. 3, 2021 (EP) ..................................... 21189474

(51) Int. Cl.
| | |
|---|---|
| *B22F 10/366* | (2021.01) |
| *B22F 10/28* | (2021.01) |
| *B22F 12/30* | (2021.01) |
| *B22F 12/43* | (2021.01) |
| *B22F 12/49* | (2021.01) |
| *B22F 12/50* | (2021.01) |

(Continued)

(52) U.S. Cl.
CPC ............ *B22F 10/366* (2021.01); *B22F 10/28* (2021.01); *B22F 12/30* (2021.01); *B22F 12/43* (2021.01); *B22F 12/49* (2021.01); *B22F 12/50* (2021.01); *B29C 64/153* (2017.08); *B33Y 10/00* (2014.12); *B33Y 50/02* (2014.12)

(58) Field of Classification Search
CPC ........ B22F 10/366; B22F 10/28; B22F 12/30; B22F 12/43; B22F 12/49; B22F 12/50; B22F 10/36; B29C 64/153; B33Y 10/00; B33Y 50/02; Y02P 10/25
See application file for complete search history.

(56) References Cited

U.S. PATENT DOCUMENTS

| | | | |
|---|---|---|---|
| 2015/0273631 A1* | 10/2015 | Kenney | B33Y 70/00 |
| | | | 219/76.1 |
| 2020/0004225 A1* | 1/2020 | Buller | B33Y 80/00 |
| 2020/0198230 A1* | 6/2020 | Lo | B33Y 50/02 |

FOREIGN PATENT DOCUMENTS

EP          3632593 A1     4/2020

OTHER PUBLICATIONS

Mirkoohi et al., Three-dimensional semi-elliptical modeling of melt pool geometry considering hatch spacing and time spacing in metal additive manufacturing, Journal of Manufacturing Processes 45 (2019) 532-543 (Year: 2019).*

* cited by examiner

*Primary Examiner* — Rebecca Janssen
(74) *Attorney, Agent, or Firm* — Wolter Van Dyke Davis, PLLC

(57) ABSTRACT

A method for the computer-aided provision of control instructions for pulsed irradiation in the additive production of a component structure includes establishing process parameters, including a pulse frequency, a pulse width, a scan speed, and an irradiation power; defining the pulse frequency and scan speed as process constants; and determining parameter values of the pulse width and of the irradiation power from the process constants which have been defined. A corresponding computer program product, a method for bed-based additive production, and a corresponding control device are adapted for pulsed irradiation in the additive production of a component structure.

20 Claims, 4 Drawing Sheets

(51) Int. Cl.
    *B29C 64/153*     (2017.01)
    *B33Y 10/00*     (2015.01)
    *B33Y 50/02*     (2015.01)

CONTROL UNIT FOR PULSED IRRADIATION IN ADDITIVE MANUFACTURE

CROSS REFERENCE TO RELATED APPLICATIONS

This application claims the benefit of European Application No. EP21189474 filed 3 Aug. 2021, incorporated by reference herein in its entirety.

FIELD OF INVENTION

The present invention relates to a method for the provision of control instructions for the additive production of a component structure and to a corresponding computer program product, as well as to a corresponding control device for an additive production apparatus.

BACKGROUND OF INVENTION

Design and material properties of high-performance machine components are the subject of constant development in order to increase and/or extend the functionality and/or fields of use of the corresponding components during use. In the case of heat engines, especially gas turbines, the development is often aimed at ever-higher working temperatures. In order for example to meet the challenges of varying industrial requirements, the development seeks in particular an increased thermomechanical load-bearing capacity and lifetime as well as a strength increase of such component structures. The present component, and/or the component structure, may accordingly be intended preferably for use in the hot-gas path of a gas turbine. For example, the component refers to a constituent part which is to be cooled, and which has a thin-walled or intricate design. As an alternative or in addition, the component may be a constituent part for use in automobility or in the aeronautical sector.

Because of further technical development, generative or additive manufacturing (AM) is also becoming increasingly beneficial for mass production of the aforementioned components.

Additive production methods, which are also colloquially known as 3D printing, comprise for example, as powder bed methods, selective laser melting (SLM) or laser sintering (SLS), or electron-beam melting (EBM). Further additive methods are for example directed energy deposition (DED) methods, in particular laser deposition welding, electron-beam or plasma powder welding, wire welding, metallic powder injection-molding, so-called sheet lamination methods, or thermal spraying methods (VPS LPPS, GDCS).

A method for selective laser melting with pulsed irradiation is known, for example, from EP 3 022 008 B1. In this case, however, pulsing of the irradiation is restricted to short pulses or ultrashort pulses, which may be used only for the construction of edge regions of a structure. This contour irradiation is also not intended—as is the purpose of the present invention—to deliver a maximally coherent structural outcome as well as control instructions for pulses in the kilohertz range. This would not even be possible because of the shortness of the pulses of the aforementioned document.

Additive manufacturing methods have furthermore proven particularly advantageous for complex or intricately configured components, for example labyrinth-like structures, cooling structures and/or lightweight structures. In particular, additive manufacturing is advantageous because of a particularly short chain of process steps, since a production or manufacturing step of a component may be carried out substantially on the basis of a corresponding CAD file and the selection of corresponding manufacturing parameters. Process or irradiation parameters are however—likewise usually upstream of the production—selected and/or employed in terms of manufacturing technology by means of computer-aided manufacturing (CAM).

In particular, the production of gas turbine blades by means of the described powder bed-based methods (LPBF, laser powder bed fusion) advantageously allows the implementation of new geometries, concepts and/or solutions which may reduce the production costs and/or the setup and throughput time, optimize the production process and, for example, improve a thermomechanical configuration or durability of the constituent parts. Constituent parts produced in a conventional way, for example by casting technology, lag significantly behind the additive manufacturing route, for example in respect of their shaping freedom as well as in relation to the required throughput time and the concomitant high costs as well as the manufacturing technology outlay.

By the powder bed process, however, high thermal stresses are inherently created in the component structure. In particular, too shortly dimensioned irradiation paths or vectors lead to strong overheating, which in turn leads to distortion of the structure. A strong distortion during the construction process may readily lead to structural detachments, thermal deformations or geometrical deviations outside a permitted tolerance.

SUMMARY OF INVENTION

It is therefore an object of the present invention to provide means for the improved process control of additive production methods. Since additive production methods have already gained entry into industrial applications and their reproducibility is becoming ever-better, even for heavily loaded constituent parts, there is a need for the many relevant parameters to be matched to one another and tared. Monitoring and improved process control, and/or the provision of corresponding control instructions, are the key to improving the material properties of the components with at the same time an inherently high shaping freedom due to the additive process.

This object is achieved by the subject-matter of the independent patent claims. The dependent claims relate to advantageous configurations of the invention.

One aspect of the present invention relates to a method for the provision, in particular computer-aided, of control instructions, in particular comprising control or irradiation parameters, for pulsed (selective) irradiation in the additive production of the component structure.

The method comprises establishing process parameters, comprising a pulse frequency, a pulse width or pulse duration, a scan speed and an irradiation power. The scan speed may, in particular, denote a track speed or scanning rate for the energy beam to be selectively controlled. The aforementioned process parameters are advantageously thus specifically irradiation parameters which necessarily need to be determined or adjusted in some way for such processes.

The method furthermore comprises defining the pulse frequency and scan speed as process constants. Here, these "constants" mean that the sizes and/or values of said parameters, at least layerwise or pathwise, remain constant and are not varied during the irradiation and/or production.

In one configuration, the pulse frequency and scan rate are defined as process constants only layerwise and/or pathwise.

The method furthermore comprises determining and/or calculating parameter values at least of the pulse width and the irradiation power from the process constants which have been defined.

A further aspect of the present invention relates to a computer program and/or computer program product comprising commands which, when the program is run by a computer, a data processing device or a corresponding controller for irradiation with an energy beam in an additive production apparatus, cause these means to carry out the described method.

The computer program (product) may for example be provided or exist as a (volatile or nonvolatile) storage or reproduction medium, for example a memory card, a USB stick, a CD-ROM or DVD, or in the form of a downloadable file of a server and/or in a computer network. The provision may furthermore be carried out, for example, in a wireless communication network by transmitting a corresponding file comprising the computer program product. A computer program product may contain program code, machine code or numerical control instructions such as G-code and/or other executable program instructions in general.

In another configuration, the computer program product relates to production instructions according to which an additive production apparatus may be controlled, for example via CAM means, by a corresponding computer program in order to produce the component. The computer program product may furthermore contain geometrical data and/or design data in a data set or data format such as a 3D format, and/or as CAD data, or may comprise a program and/or program code for providing these data.

The effect advantageously achieved by the means according to the invention is that improved physical-mechanical properties of the component are already established in preparation for the process. In this way, at the same time, manufacturing rejects are reduced and the process efficiency and/or throughput is increased. In particular, the present invention achieves the effect of improving the material quality of intricate or thin-walled component structures by an improved pulsed operating mode.

In one configuration, a value of the pulse frequency between 1 kHz and 25 kHz is selected or determined. By selecting the frequency approximately within this value range, pulsed irradiation may also be carried out expediently for small spatial resolutions of as little as 100 µm, or less, of the structures to be constructed. The frequency is also expediently matched according to this configuration to the parameter of the scan speed, and/or an expedient (temporal and/or spatial) pulse or melt pool overlap is achieved by selecting these quantities.

In one configuration, the irradiation power advantageously relates to a peak or pulse power, or an average or averaged power per period of the respective pulsed energy input.

In one configuration, the value of the power is determined between 50 W and 300 W. By this configuration, expedient energy input and matching of the power to the other parameters may likewise be carried out. It is known that the extent of the locally limited energy input into a powder bed is difficult to manage, and is therefore critical in respect of the component structure to be achieved. Excess energy input as well as insufficient energy input may lead to an unsatisfactory structural outcome. With an introduced energy that is too high, material evaporation, pores or cavities may occur in the structure, while an insufficient energy input may at the same time entail an insufficient melting outcome.

In one configuration, the parameter of the melt pool overlap is additionally defined as a process constant. The aforementioned melt pool overlap is then furthermore determined from parameter values of the established process parameters.

In one configuration, a pathwise melt pool overlap is determined from parameter values of the frequency, pulse width and scan speed; and a layerwise melt pool overlap is at least essentially determined from a value of the irradiation power, or calculated therefrom.

In one configuration, a duty cycle of between 25% and 75%, in particular 50%, is selected for the pulsed irradiation. A duty cycle advantageously corresponds to the ratio of pulse width or pulse duration to the period duration. Accordingly, a duty cycle of 50% corresponds to a so-called symmetrical pulse.

In one configuration, a value of the scan speed between 100 mm/s and 3000 mm/s is selected. Such track or scan speeds in the beam guiding have been found to be an expedient optimum in order, on the one hand, to achieve a suitable energy input into the powder bed and, on the other hand, to achieve good process progress.

In one configuration, with an increasing defined pulse frequency, a lower irradiation power and a smaller pulse width are determined. This relationship derives in particular from the fact that a certain response time of the energy beam or laser, and/or of a corresponding beam source, needs to be taken into account for highly set pulse frequencies.

A further aspect of the present invention relates to a method for the powder bed-based additive production of a component structure by means of the control instructions provided. By the described production method, the advantages of the improved control may furthermore be manifested in (improved) component properties of the structure constructed.

A further aspect of the present invention relates to a control device for the additive production of a component structure, wherein the control device is configured to employ the provided control instructions in order to control an energy beam such as a laser beam, or a corresponding beam source, of an additive production apparatus in the course of the additive production of the component structure.

A further aspect of the present invention relates to an additive production apparatus comprising the described control device.

Configurations, features and/or advantages which relate here to the method for the provision of control instructions and/or the computer program product may furthermore pertain to the additive production method directly or to the control device, and vice versa.

When it is used in a series of two or more elements, the expression "and/or" employed here means that each of the elements mentioned may be used individually, or any combination of two or more of the elements mentioned may be used.

Further details of the invention will be described below with the aid of the figures.

DETAILED DESCRIPTION OF INVENTION

In the exemplary embodiments and figures, elements which are the same or have the same effect may respectively be provided with the same references. The elements represented and their size proportions with respect to one another are not in principle to be regarded as true to scale, and individual elements may instead be represented as being exaggeratedly thick or large for improved representability and/or for improved understanding.

Figure 1:
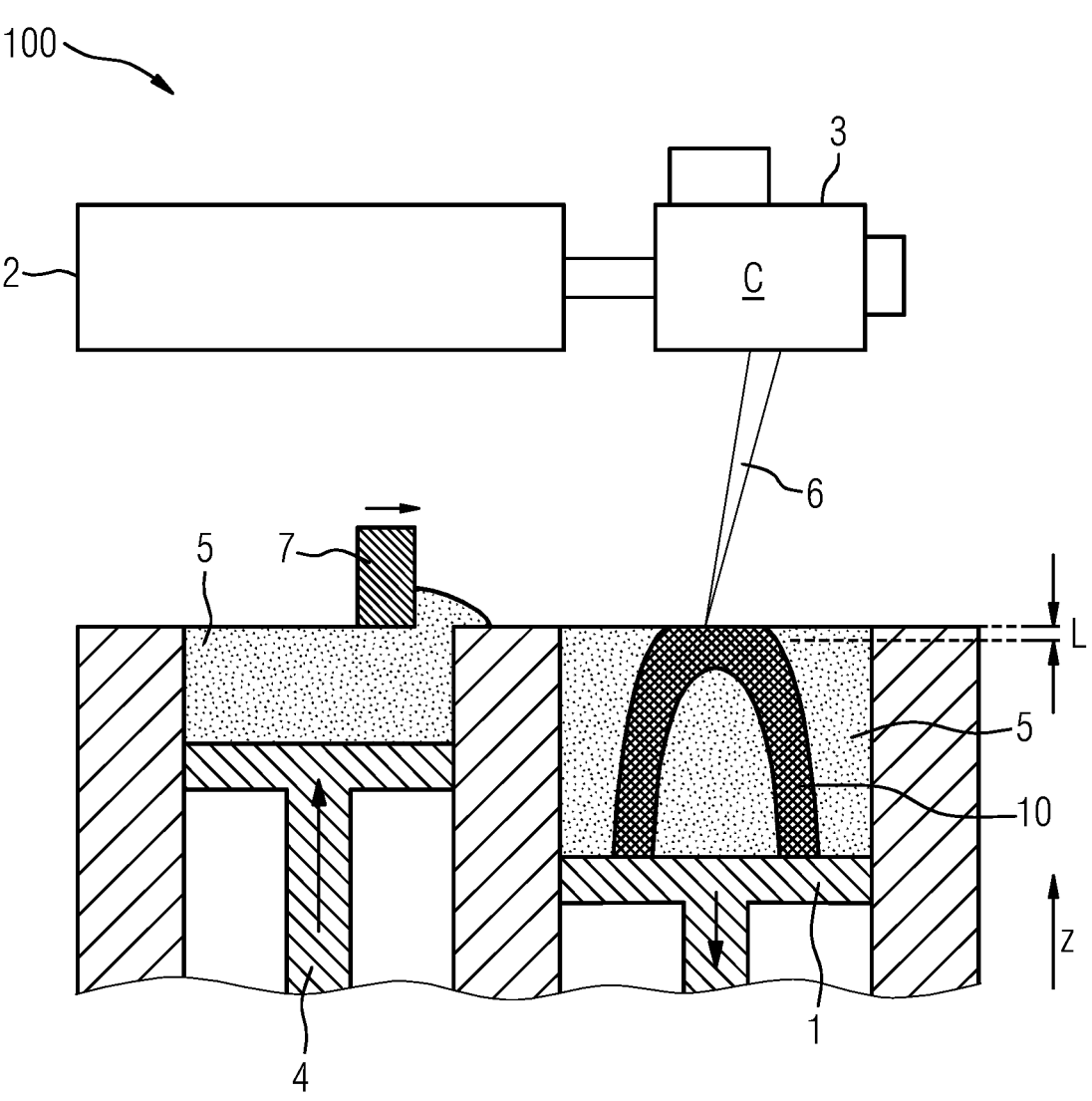
FIG. 1 indicates the principle of additive powder bed methods with the aid of a schematic sectional view of a corresponding production apparatus.

FIG. 1 shows an additive production apparatus 100. The production apparatus 100 is advantageously configured as an LPBF apparatus and for the additive construction of components or constituent parts from a powder bed. The apparatus 100 may especially also refer to an apparatus for electron beam melting.

Accordingly, the apparatus comprises a construction platform 1. A component 10 to be additively produced is produced layerwise on the construction platform 1 from a powder bed. The latter is formed by a powder material 5, which may for example be distributed layerwise on the construction platform 1 by means of a cylinder 4 and then a coater 7.

After the application of each powder layer L, regions of the layer are selectively melted with an energy beam 6, for example a laser or an electron beam, and subsequently solidified, according to the predetermined geometry of the component 10. In this way, the component 10 is constructed layerwise along the construction direction z shown.

The energy beam 6 advantageously comes from a beam source 2 and is scanned position-selectively over each layer L by means of a controller 3.

The controller or control device 3 is advantageously configured to employ the control instructions in order to control the energy beam 6 in the course of the additive production of the component structure 10.

After each layer L, the construction platform 1 is advantageously lowered by an extent corresponding to the layer thickness (cf. arrow directed downward on the right in FIG. 1). A thickness of the layer(s) L is usually only between 20 μm and 40 μm, so that the overall process may easily comprise the selective irradiation of thousands to tens of thousands of layers. High temperature gradients, for example of $10^6$ K/s or more, may in this case occur because of the only very locally acting energy input. A stress state of the component is therefore also correspondingly high during the construction and thereafter, which generally makes additive production processes much more complicated.

The component 10 may be a component of a turbomachine, for example a component for the hot-gas path of a gas turbine. In particular, the component may refer to a rotor blade or guide vane, a ring segment, a combustion chamber part or burner part, such as a burner tip, a shroud, a screen, a heat shield, a nozzle, a seal, a filter, an orifice or lance, a resonator, a piston or a swirler, or a corresponding transition, insert, or a corresponding retrofit part.

The geometry of the component is conventionally established by a CAD file. After such a file has been read into the production apparatus 100 or the controller 3, the process subsequently requires first the establishment of a suitable irradiation strategy, for example by CAM means, so that the component geometry is also divided into the individual layers. Accordingly, the measures according to the invention as described below in the additive production of material layers may also already be expressed by a computer program product C. The computer program product C to this end advantageously comprises commands which, when a corresponding program or method is run by a computer, or the controller 3, cause it to carry out control instructions according to the invention and/or the selective irradiation accordingly.

Figure 2:
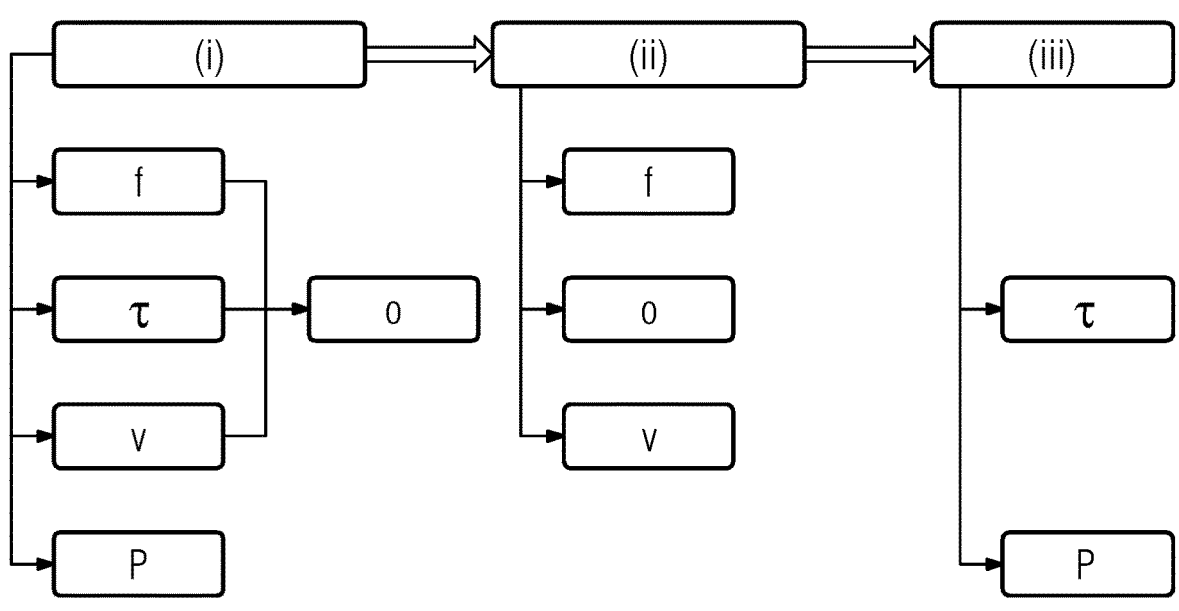
FIG. 2 shows a schematic flow chart indicating method steps according to the invention.

The method steps according to the invention are illustrated with the aid of FIG. 2. The method according to the invention is primarily a method for the computer-aided provision of control instructions for pulsed irradiation in the additive production of the component structure 10.

The method comprises (i) establishing process parameters, comprising a pulse frequency f, a pulse duration or pulse width τ, a scan speed v and an irradiation power P, as indicated in the left part of FIG. 2. With the aid of the pulse width τ, the pulse frequency f and/or the scan speed v, a melt pool overlap o may in particular also be determined (see below). The arrows and connections in the left part of the representation of FIG. 2 are intended to indicate that the irradiation parameters described are correlated and/or interact with one another.

Figure 3:
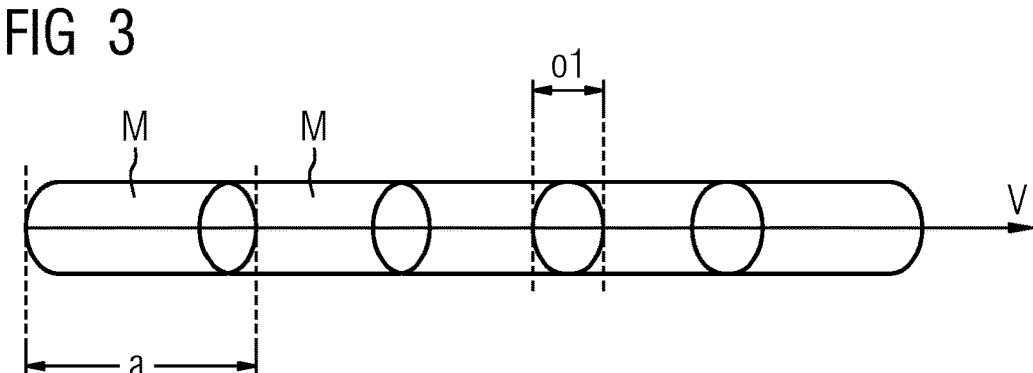
FIG. 3 indicates a setpoint situation with respect to process parameters determined based on a schematic plan view of an irradiation path.
Figure 4:
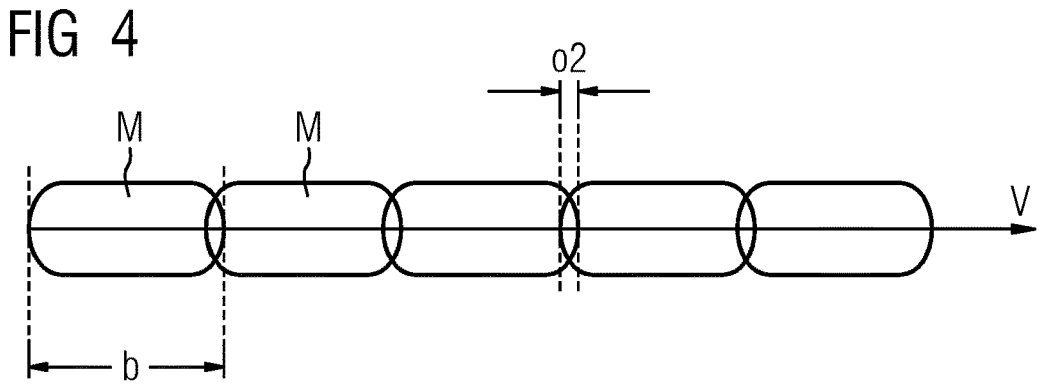
FIG. 4 indicates an actual situation with respect to process parameters determined based on a schematic plan view of an irradiation path.

The method furthermore comprises (ii) defining a pulse frequency f and a scan speed v as process constants, as indicated in the middle part of FIG. 2. These parameters are in particular kept constant for the irradiation of a layerwise irradiation pattern and/or for the irradiation of individual vectors or paths (as represented in FIGS. 3 and 4 below).

The method furthermore comprises (cf. (iii) on the right in FIG. 2), determining parameter values of at least the pulse width τ and the irradiation power P from the process constants which have been defined.

A parameter value of the pulse frequency f may, in particular, be selected from a value range of between 1 kHz and 25 kHz.

Furthermore, a parameter value of the irradiation power P, which advantageously indicates a peak power or an average power per period, of between 50 W and 300 W may be determined.

A melt pool overlap o (cf. likewise FIGS. 3 and 4 below) may furthermore be defined as a process constant and additionally be determined from parameter values of the established process parameters. The melt pool overlap mentioned here may furthermore refer to a pathwise melt pool overlap, namely one such as is shown with the aid of the references o1 and o2 in FIGS. 3 and 4 below, respectively; and to a layerwise melt pool overlap (not explicitly denoted here). The pathwise melt pool overlap o may in particular be determined from parameter values of frequency, pulse width τ and scan speed v; while the layerwise melt pool overlap may essentially be defined by the irradiation power P. Under given further parameters, as is known, the irradiation power also determines the extent of a melt pool along the construction direction z and/or along the layer sequence.

Parameter values of the duty cycle of the pulsed irradiation may for example be selected from a range of between 25% and 75%, for example 50% or more or less.

A value of the scan speed v may however be selected from a range of between 50 mm/s or 100 mm/s and 3000 mm/s, for example 200 mm/s, 300 mm/s, 500 mm/s, 1000 mm/s, 1500 mm/s, 2000 mm/s, 2500 mm/s or more or less.

Often, it may be observed that with an increasing defined pulse frequency f, a lower irradiation power P and a shorter pulse width $\tau$ must also be selected (see FIGS. 5 and 6 below).

The algorithm provided by the means according to the invention advantageously—as described above—dimensions the relevant irradiation parameters and matches them to one another in order to obtain an expedient structural outcome of the component structure 10 and/or to counteract control artefacts.

FIG. 3 shows a schematic plan view of an irradiation path in pulsed irradiation operation for at least a part of each component layer. The irradiation path or vector is denoted by the reference V. Individual pulses and/or melt pools M with the length a of the vector V are intended to be indicated elliptically, the neighboring pulses overlapping (spatially) in a lenticular or circular region o1. Such an overlap o1 may qualitatively refer in the present case to an expedient measure for the production of a coherent structure for the component.

FIG. 4 shows—in a similar way to FIG. 3—a schematic plan view of an irradiation path V. In contrast to FIG. 3, pulses and/or corresponding melt pools having a length b, with b<a, are respectively shown here. Melt pools M shortened in this way may be produced, for example, by a shorter pulse width $\tau$. It is furthermore shown that the melt pools M overlap only within a very small overlap region o2. Consequently, the overlap o2 is no longer sufficient to bring about a homogeneous or coherent component structure 10.

Although this is not explicitly denoted here, a person skilled in the art will clearly understand with reference to the representation of FIG. 1 that a corresponding melt pool overlap is necessary not only pathwise but also layerwise in order to produce a continuous component structure 10. This is because with a reduction of the irradiation power, for example, beyond a certain point the overlap of the melt pools along the construction direction z would also be critically reduced.

Instead of a coherent component structure, with an insufficient overlap at best a porous and unstable component structure would be obtained.

Figure 5:
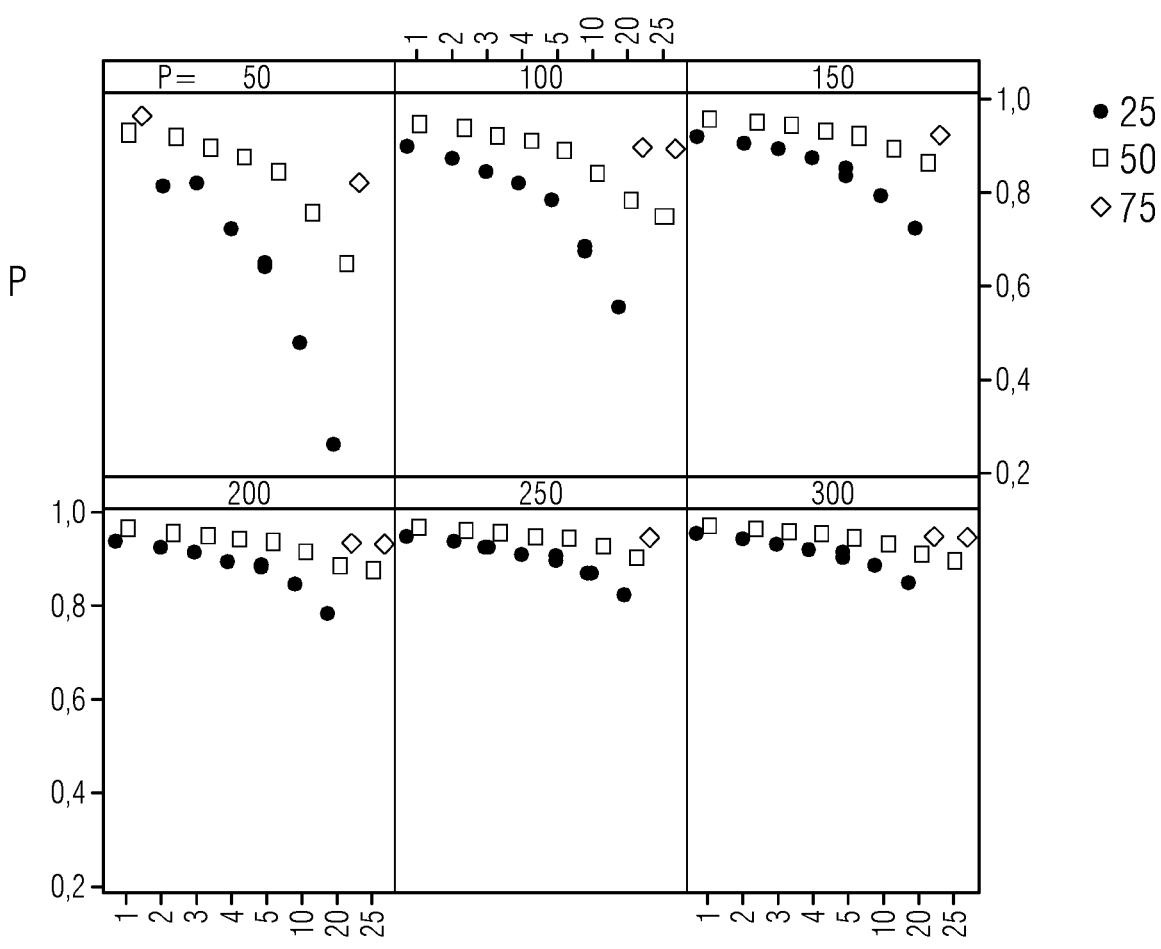
FIG. 5 shows a diagrammatic overview of the measured profile of the irradiation power, parametrically plotted as a function of the pulse frequency and respectively the duty cycle.
Figure 6:
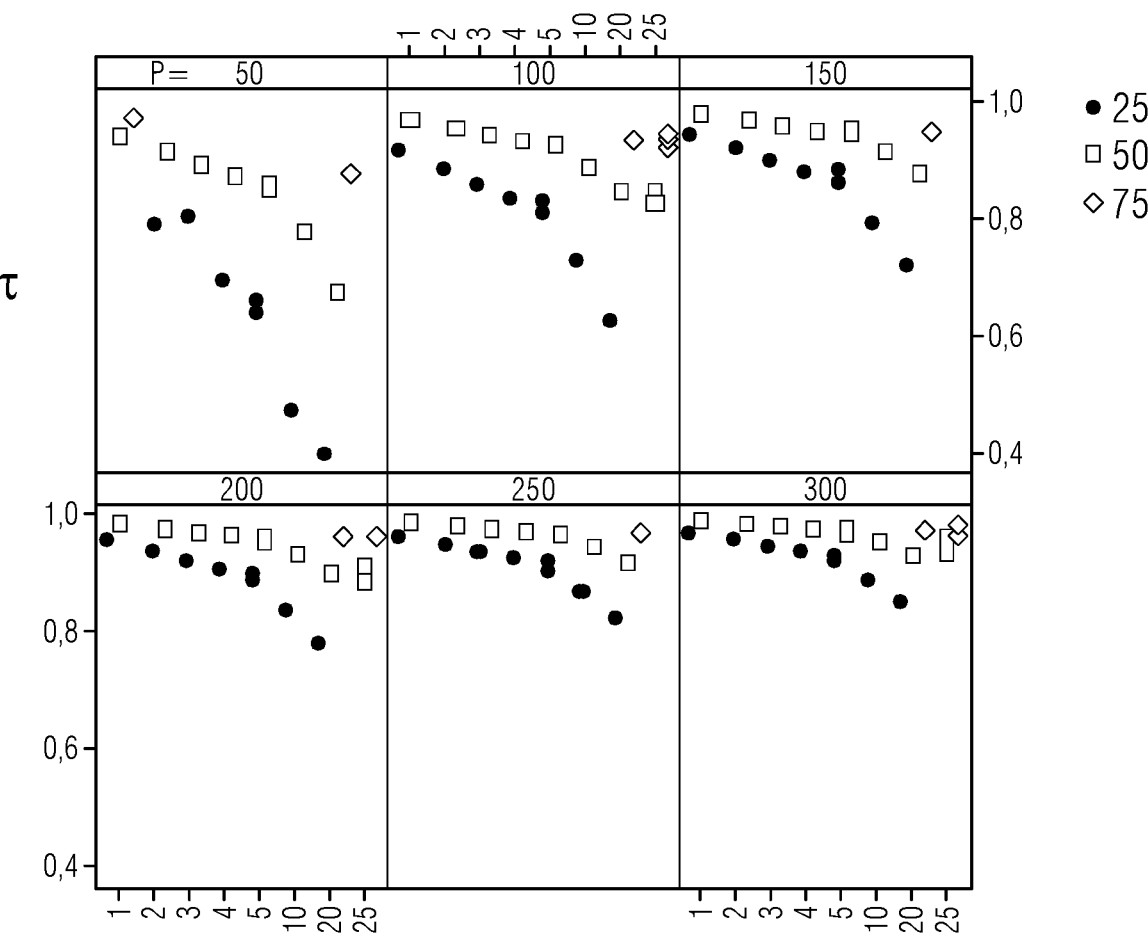
FIG. 6 shows a diagrammatic overview of the pulse width which is plotted, while being parameterized by the irradiation power, as a function of the pulse frequency and respectively the duty cycle.

FIGS. 5 and 6 show (further) correlation effects of irradiation parameters with the aid of exemplary measurement values.

With the aid of six partial diagrams, FIG. 5 respectively shows measurement values of a pulsewise normalized irradiation power (field variable) in the relevant context. By the partial representation from the top left to the bottom right, the setpoint value of the irradiation power is respectively shown in varying 50 watt steps from 50 to 300 W. A further parameter for which measurement values are respectively shown is the duty cycle (cf. the legend at the top right in FIG. 5). This represents the dimensionless ratio of the pulse width to the period duration of the respective pulse. Here, measurement values are respectively shown for a duty cycle of 25%, 50% and 75%. A further parameter on the X axis is the frequency, to which the normalized power, that is to say a corresponding drop in the measured power, is respectively assigned particularly at 1 kHz, at 2 kHz, at 3 kHz, at 4 kHz, at 5 kHz, at 10 kHz, at 20 kHz and at 25 kHz.

It may be seen that with an increasing frequency, as well as overall at very low setpoint powers, for example of 50 W and 100 W, there is a smaller actual value, that is to say a greater drop relative to the setpoint value.

FIG. 6 shows a situation very similar to FIG. 5, merely with the difference that the normalized pulse width $\tau$—instead of the power—is respectively plotted on the Y axis. A profile of the pulse width similar to the behavior of the power is now again to be seen from FIG. 6. With an increasing frequency and at rather low powers (cf. the upper row of the partial representation), there is also a smaller pulse width.

These deviations or artefacts may be explained in that a laser in conventional production apparatuses (without the control solution according to the invention) is often configured for a high power range, nominally for example about 1000 W, and it cannot therefore be controlled reliably in the low power range.

For high frequencies, the described deviation may be explained qualitatively in that, with a rising frequency, an inherent response time must also increasingly be taken into account in the control of the laser.

The described deviations may still be successfully resolved, or compensated for, by the means of the present invention.

The invention claimed is:

1. A method for additive production of a component structure, comprising:
   a) providing, via a computer, control instructions (f, $\tau$, v, P) for pulsed irradiation, comprising:
      i) establishing process parameters, comprising a pulse frequency (f), a pulse width ($\tau$), a scan speed (v) and an irradiation power (P),
      ii) defining the pulse frequency (f) and scan speed (v) as process constants and defining a melt pool overlap (o) as a process constant, wherein the melt pool overlap (o) is based on parameter values of the established process parameters, and
      iii) determining parameter values of the pulse width ($\tau$) and of the irradiation power (P) from the process constants which have been defined;
   b) executing the control instructions for the additive production of the component structure comprising generating an energy beam along an irradiation path (V) including generating consecutive pulses of the pulsed irradiation along the irradiation path (V) and generating consecutive melt pools along the irradiation path (V) wherein the consecutive melt pools have the melt pool overlap (o) along the irradiation path (V).

2. The method as claimed in claim 1, wherein a value of the pulse frequency (f) between 1 kHz and 25 kHz is selected.

3. The method as claimed in claim 1, wherein a value of the irradiation power (P) between 50 W and 300 W is determined such that the value of the irradiation power (P) is above a first threshold to ensure sufficient melting of a powder bed and below a second threshold to avoid material evaporation, pores or cavities in the component structure.

4. The method as claimed in claim 1, wherein the consecutive melt pools have the melt pool overlap (o) along the irradiation path (V) that is above a threshold value to achieve a homogeneous and coherent component structure.

5. The method as claimed in claim 1,
wherein the melt pool overlap (o) comprises;
  a pathwise melt pool overlap based on parameter values of the pulse width ($\tau$), pulse frequency (f) and scan speed (v), and
  a layerwise melt pool overlap based on a value of the irradiation power (P).

6. The method as claimed in claim 1,
wherein a geometry of the component structure is divided into layers and wherein the pulse frequency (f) and scan speed (v) are defined as process constants with each of the divided layers.

7. The method as claimed in claim 1,
wherein a duty cycle of between 25% and 75% is selected for the pulsed irradiation.

8. The method as claimed in claim 1,
wherein a value of the scan speed (v) between 100 mm/s and 3000 mm/s is selected.

9. The method as claimed in claim 1,
wherein with an increasing defined pulse frequency (f), a lower irradiation power (P) and a smaller pulse width ($\tau$) are determined.

10. A computer program product stored on a non-transitory computer readable media, comprising:
  commands which, when executed by a computer, cause this computer to carry out the method as claimed in claim 1.

11. A control device for the additive production of a component structure,
  wherein the control device is configured to employ the control instructions provided by the method as claimed in claim 1 in order to control an energy beam of an additive production apparatus in the course of the additive production of the component structure.

12. An additive production apparatus, comprising:
  a control device as claimed in claim 11;
  a construction platform;
  a powder bed;
  a coater configured to distribute powder from the powder bed layerwise on the construction platform;
  a beam source of the energy beam;
  wherein the control device is configured to employ the control instructions to control the energy beam along an irradiation path (V) such that the executing step (b) comprises generating the energy beam with consecutive pulses of the pulsed radiation and generating consecutive melt pools with the consecutive pulses in each layer of the powder bed on the construction platform such that the consecutive melt pools have a melt pool overlap (o) along the irradiation path (V) based on the determined parameter values of the pulse width and the irradiation power and such that the melt pool overlap (o) is above a threshold value to achieve a homogeneous and coherent component structure.

13. The method as claimed in claim 7,
wherein a duty cycle of 50% is selected for the pulsed irradiation.

14. The computer program product as claimed in claim 10,
  wherein the commands control the irradiation in an additive production apparatus.

15. The control device as claimed in claim 11,
  wherein the energy beam comprises a laser beam.

16. The method as claimed in claim 1, wherein a value of the melt pool overlap (o) is based on a value of the pulse width and wherein the value of the pulse width is selected such that the value of the melt pool overlap (o) is sufficient to bring about a homogeneous or coherent structure of the component in the executing step b).

17. The method as claimed in claim 16, wherein the executing step b) comprises generating individual pulses having a respective length along an irradiation path which produce respective melt pools with the same respective length along the irradiation path, wherein the respective melt pools overlap by the melt pool overlap (o).

18. The method as claimed in claim 5,
  wherein a value of the pathwise melt pool overlap is based on a value of the pulse width and wherein the value of the pulse width is selected such that the value of the melt pool overlap (o) is above a threshold value to bring about a homogeneous or coherent structure of the component in the executing step b); and
  wherein a value of the layerwise melt pool overlap is based on a value of the irradiation power and wherein the value of the irradiation power is above a threshold value to bring about a homogeneous or coherent structure of the component in the executing step b).

19. The method as claimed in claim 17, wherein the respective melt pools are elliptical in shape and wherein the melt pool overlap is a lenticular or circular region.

20. A method for additive production of a component structure, comprising:
  a) providing, via a computer, control instructions (f, $\tau$, v, P) for pulsed irradiation, comprising:
    i) establishing process parameters, comprising a pulse frequency (f), a pulse width ($\tau$), a scan speed (v) and an irradiation power (P),
    ii) defining the pulse frequency (f), the scan speed (v) as process constants which have constant values during the method, and
    iii) determining parameter values of the pulse width ($\tau$) and of the irradiation power (P) from the constant values of the process constants which have been defined;
  b) executing the control instructions for the additive production of the component structure including generating an energy beam along an irradiation path (V) including generating consecutive pulses of the pulsed radiation along the irradiation path (V) and generating consecutive melt pools along the irradiation path (V) with the consecutive pulses, wherein the consecutive melt pools have a melt pool overlap (o) along the irradiation path (V) based on the determined parameter values of the pulse width and the irradiation power such that the melt pool overlap (o) along the irradiation path (V) is above a threshold value to achieve a homogeneous and coherent component structure.

* * * * *